(12) United States Patent
Wang et al.

(10) Patent No.: US 8,319,374 B2
(45) Date of Patent: Nov. 27, 2012

(54) ELECTRICAL SYSTEM AND CONTROL METHOD

(75) Inventors: Changyong Wang, Shanghai (CN); Zhuohui Tan, Shanghai (CN); Robert William Delmerico, Clifton Park, NY (US); Allen Michael Ritter, Roanoke, VA (US); Ralph Teichmann, Clifton Park, NY (US); Richard S. Zhang, Rexford, NY (US); Robert Allen Seymour, Roanoke, VA (US); Xiaoming Yuan, Shanghai (CN)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 13/178,800

(22) Filed: Jul. 8, 2011

(65) Prior Publication Data

US 2011/0260547 A1 Oct. 27, 2011

Related U.S. Application Data

(62) Division of application No. 12/341,862, filed on Dec. 22, 2008, now Pat. No. 7,999,418.

(51) Int. Cl.
*H02J 1/00* (2006.01)
(52) U.S. Cl. .......................................... 307/82; 363/71
(58) Field of Classification Search .................... 307/82, 307/151
See application file for complete search history.

(56) References Cited

U.S. PATENT DOCUMENTS

| | | | | |
|---|---|---|---|---|
| 5,933,339 | A * | 8/1999 | Duba et al. ....................... | 363/71 |
| 6,101,109 | A | 8/2000 | Duba et al. | |
| 7,071,579 | B2 | 7/2006 | Erdman et al. | |
| 7,808,125 | B1 * | 10/2010 | Sachdeva et al. ................ | 307/82 |
| 2005/0225090 | A1 * | 10/2005 | Wobben ........................... | 290/44 |
| 2006/0120121 | A1 * | 6/2006 | Chang et al. ..................... | 363/71 |

FOREIGN PATENT DOCUMENTS

| | | |
|---|---|---|
| EP | 1995863 A2 | 11/2008 |
| WO | 2008006020 A2 | 1/2008 |
| WO | 2008025363 A1 | 3/2008 |

OTHER PUBLICATIONS

McGrath, B.P.; Holmes, D.G.; , "A comparison of multicarrier PWM strategies for cascaded and neutral point clamped multilevel inverters," Power Electronics Specialists Conference, 2000. PESC 00. 2000 IEEE 31st Annual , vol. 2, No., pp. 674-679 vol. 2, 2000.*

McNerney et. al., The Statistical Smoothing of Power Delivered to Utilities by Multiple Wind Turbines, IEEE Transactions of Energy Conversion, vol. 7, No. 4, pp. 644-647. Dec. 1992.

Holmes et al., "Opportunities for Harmonic Cancellation with Carrier-Based PWM for Two-Level and Multilevel Cascaded Inverters", IEEE Transactions on Industry Applications, vol. 37, No. 2, pp. 574-582. Mar./Apr. 2001.

* cited by examiner

*Primary Examiner* — Daniel Cavallari
(74) *Attorney, Agent, or Firm* — Ann M. Agosti

(57) ABSTRACT

A method of controlling electrical power systems coupled to an electrical connection point includes obtaining carrier signals and fundamental waveforms from electrical power systems coupled to at least two renewable energy sources, generating pulse width modulation (PWM) signals using the carrier signals and the fundamental waveforms while interleaving carrier signals, fundamental waveforms, or a combination of carrier signals and fundamental waveforms of the electrical power systems, and driving grid side converters of the electrical power systems with the PWM signals.

9 Claims, 13 Drawing Sheets

FUNDAMENTAL WAVEFORMS SHIFTED

ELECTRICAL SYSTEM AND CONTROL METHOD

CROSS REFERENCE TO RELATED APPLICATIONS

This application is a divisional of U.S. patent application Ser. No. 12/341,862, entitled "ELECTRICAL SYSTEM AND CONTROL METHOD," filed 22 Dec. 2008, which is herein incorporated by reference.

BACKGROUND

The invention relates generally to electrical systems for providing electrical power to utility grids at interconnection points. More specifically, the invention relates to an electrical system which converts electrical power generated by renewable energy sources such as wind turbines and photovoltaic modules into electrical power which meets a low harmonic requirement of the interconnection point.

Recently, renewable energy sources, such as wind turbines, have received increased attention as environmentally safe and relatively inexpensive alternative energy sources. With this growing interest, considerable efforts have been made to develop wind turbines that are reliable and efficient. To maximize the efficacy of power generation and to simplify connection to the utility grid, wind turbines are often located in proximity to one another, which are generally referred to in the pertinent arts as a "wind farm." Wind turbines in the wind farm generate electrical power and feed electrical current into the utility, such as a power grid, at a point of common connection (PCC).

A type of wind turbine that keeps the rotational generator speed proportional to the wind speed is a variable speed wind turbine. Examples of the variable speed wind turbine are described in, for example, Richardson et al., U.S. Pat. No. 5,083,039. The variable speed wind turbine includes a generator, a converter on the generator side, a DC link Bus, and a converter connected to the grid. The variable frequency energy of the generator is transferred to the DC link bus by the generator side converter and later converted to a fixed frequency by the grid side converter.

The grid side active converter typically utilizes semiconductor switches, such as insulated gate bipolar transistors (IGBTs), to convert DC voltage to AC voltage at the grid frequency by pulse width modulated switching actions of those semiconductor switches. The switching actions tend to create undesirable harmonics. To avoid the problems caused by these harmonics, a number of filters are installed. The filter components are typically bulky and expensive.

There is a need in the art to provide an improved electrical system for a wind farm which can meet the low harmonics requirement at an electrical connection point for a group of wind turbines which differs from conventional systems. Such systems would additionally be useful for other renewable energy sources such as photovoltaic systems, for example.

BRIEF DESCRIPTION

In accordance with an embodiment disclosed herein, a power generation system comprises at least two electrical systems connected in parallel at an electrical connection point. Each electrical system comprises a power conversion system comprising a converter including a plurality of switches for converting direct current power into alternating current power. The power generation system comprises a control system including at least two pulse width modulation (PWM) modulators, each PWM modulator for obtaining a fundamental waveform and a carrier signal, using the fundamental and carrier signals to generate a PWM pattern, and for providing the PWM pattern to a respective converter for driving the switches of the respective converter. The control system is configured to interleave carrier signals, fundamental waveforms, or a combination of carrier signals and fundamental waveforms of the at least two electrical systems to generate interleaved PWM patterns respectively for the at least two converters.

In accordance with another embodiment disclosed herein, a method of controlling electrical power systems coupled to an electrical connection point is provided. The method comprises obtaining carrier signals and fundamental waveforms; generating pulse width modulation (PWM) signals using the carrier signals and the fundamental waveforms while interleaving carrier signals, fundamental waveforms, or a combination of carrier signals and fundamental waveforms of the electrical power systems; and driving grid side converters of the electrical power systems with the PWM signals.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Embodiments described below generally relate to a power generation system with at least two electrical systems connected in parallel at an electrical connection point such at an electric grid or a substation system of a power generation system. For purposes of illustration, the electrical systems are illustrated in FIGS. 1-13 as wind turbine electrical systems. Each wind turbine electrical system includes a pulse width modulation (PWM) controller for obtaining a fundamental waveform and a carrier signal, and for generating a PWM pattern for a respective grid side converter to use when driving switches of the respective grid side converter. A control system is configured to reduce harmonics at the electrical connection point by interleaving the carrier signals, or fundamental waveforms, or a combination of carrier signals and fundamental waveforms to generate interleaved PWM patterns respectively for the grid side converters of the wind turbine electrical systems. Thus, a combination of the waveforms of the wind turbine electrical systems at the electrical connection point has relatively low harmonics. Accordingly, in one aspect, passive filter designs of the wind turbine electrical systems can be significantly simplified. In another aspect, switches of the grid side converters are allowed to have a relatively low switching frequency, energy losses of the switches are decreased, and power efficiencies of the grid side converters are increased.

Figure 1:
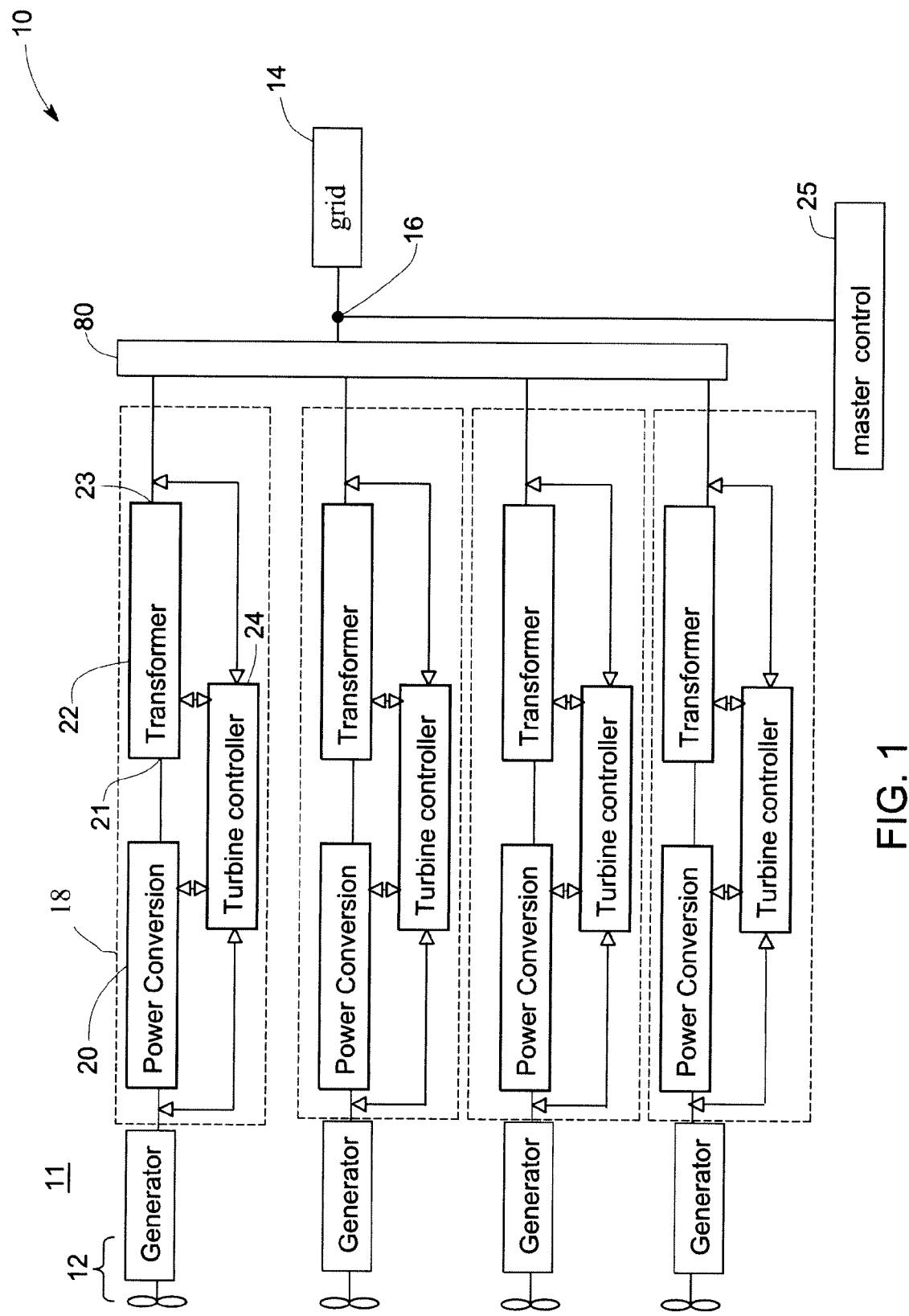
FIG. 1 is a block diagram illustrating a wind farm in accordance with one embodiment disclosed herein.

FIG. 1 illustrates a wind farm 11 that includes a plurality of wind turbines 12 connected in parallel to feed electrical power to an electric grid 14 at an electrical connection point 16 which is in one embodiment a Point of Common Connection (PCC).

An exemplary power generation system 10 for wind farm 11 includes a plurality of wind turbine electrical systems 18. Each wind turbine electrical system 18 includes one power conversion system 20 for converting electrical power generated by a generator 28 of wind turbine 12 into an alternating current with a constant voltage and a constant frequency, and a turbine transformer 22 for transforming the alternating current into a constant voltage and a certain frequency before the alternating current is fed to electric grid 14 at PCC 16. Electrical system 10 includes a control system which may comprise a plurality of turbine controllers 24, a master controller 25, or a combination of turbine and master controllers.

Figure 2:
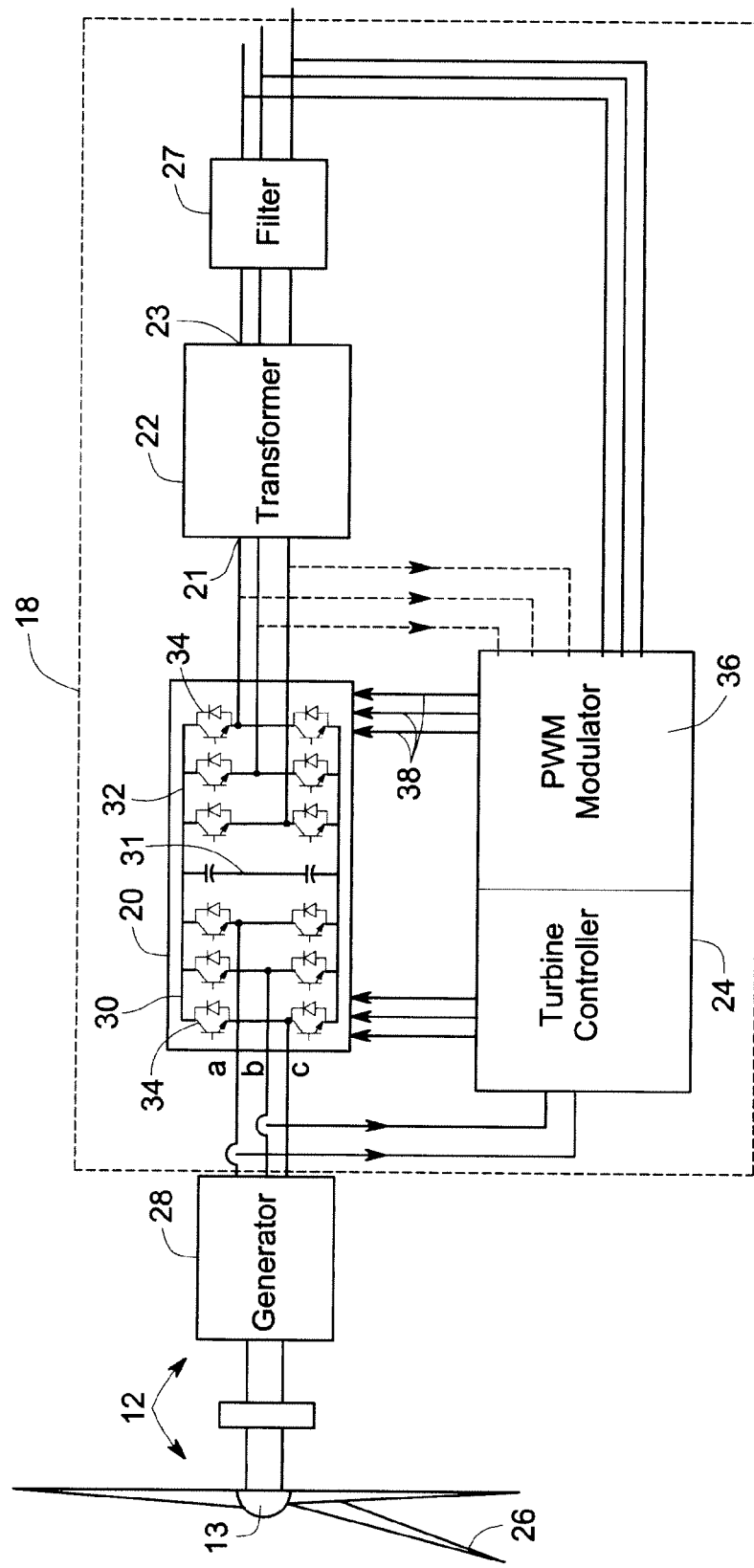
FIG. 2 is a block diagram of a wind turbine electrical system in accordance with an embodiment disclosed herein.

FIG. 2 illustrates an embodiment wherein wind turbine 12 includes a rotor 13 with blades 26 that are coupled to generator 28 that in turn is coupled to the wind turbine electrical system 18. In one embodiment, generator 28 comprises a permanent magnet synchronous machine. The coupling of the rotor to generator 28 may either be a direct coupling or via an optional gear box (not shown). The exemplary generator 28 is a synchronous generator, however, the invention may also be used with other generators such as doubly fed induction generators. In some embodiments, wind turbines 12 have generators with the same or similar rated output power. Turbine transformer 22 transforms the alternating current from a grid side converter 32 at a lower voltage side 21 into a higher voltage at a high voltage side 23. In one embodiment, wind turbine electrical system 18 further includes a passive filter 27 in series connection with high voltage side 23 of transformer 22 for further reduction of harmonics.

Generator 28 is coupled via a stator (not shown) to power conversion system 20 of wind turbine electrical system 18. Power conversion system 20 receives the electricity from generator 28 and converts the electricity into appropriate form for delivery to power grid 14 (FIG. 1). Power conversion system 20 in the exemplary embodiment is an AC-DC-AC converter which includes a generator side converter 30, a DC link Bus 31, and grid side converter 32. Each of the generator side and grid side converters 30 and 32 includes switches 34. Switches 34 may comprise any appropriate devices with several examples including Insulated Gate Bipolar Transistors (IGBTs), Gate Communicated Thyristors (GCTs), and Metal Oxide Semiconductor Field Effect Transistors (MOSFETs). In the illustrated embodiment, generator side converter 30 and grid side converter 32 are two-level converters. In other embodiments, the generator side converter 30 and grid side converter 32 may be multi-level converters.

In certain embodiments, grid side converter 32 comprises a Pulse-Width-Modulating (PWM) converter including three phases each having two switches 34. In one embodiment, turbine controller 24 includes a PWM modulator 36 which provides modulated PWM pattern signals 38 for controlling switches 34. Grid side converter 32 thus transforms a direct current at DC bus 31 by the modulated PWM pattern signals 38 into a three-phase alternating current with a controlled voltage and frequency.

In one embodiment, PWM modulator 36 receives reference (current or voltage) waveforms at PCC 16. In such embodiments, the reference waveforms for each wind turbine electrical system 18 are thus identical and referred to as a "global reference." In an alternative embodiment, as shown by dashed lines in FIG. 2, the PWM modulator 36 receives reference waveforms from the output of power conversion system 20, and the reference waveforms are respectively referred to as "local references." The local references of different wind turbine electrical systems 18 may by slightly shifted in phase. Phase quantities of the three phases Ua, Ub and Uc of an individual wind turbine electrical system 18 are spaced from one another by 120 degrees.

Figure 3:
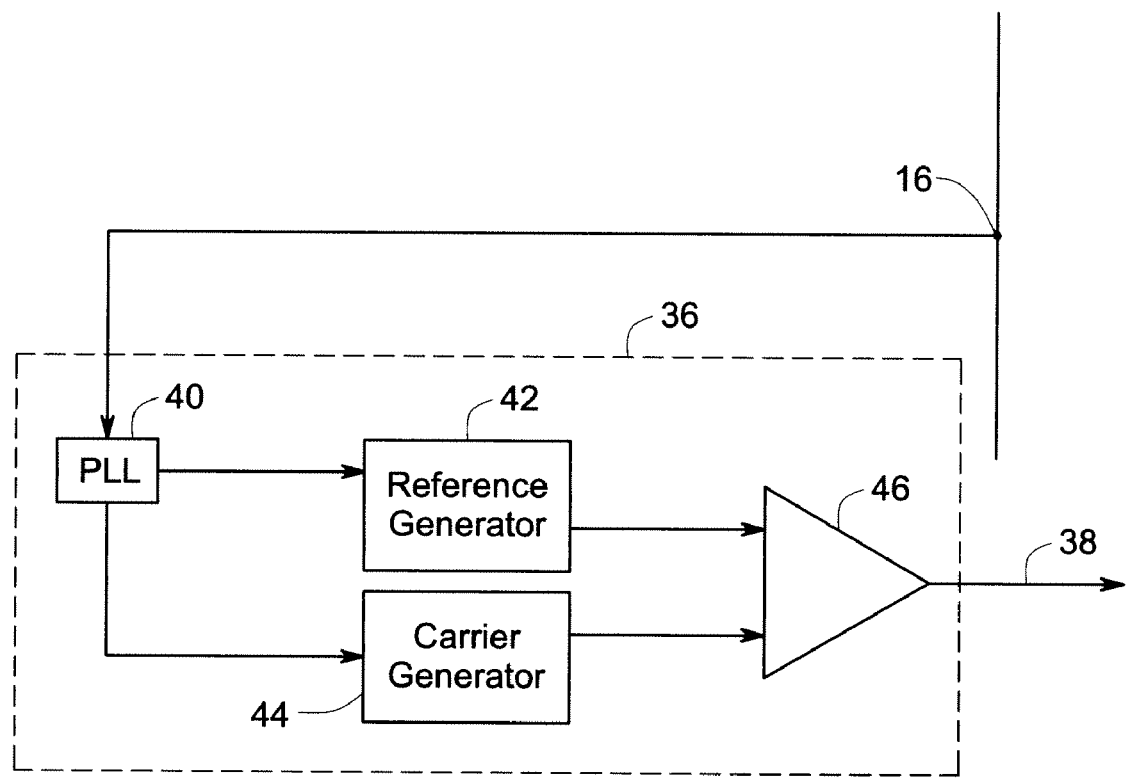
FIG. 3 is a block diagram of a PWM modulator for generating PWM patterns for semiconductor switches of converters in a wind turbine electrical system.

Referring to FIG. 3, PWM modulator 36, in one embodiment, may comprise a Phase-Lock Loop (PLL) circuit 40 for measuring a phase and an amplitude of a reference waveform, a reference generator 42 for receiving the phase and amplitude information of the reference waveform and generating a fundamental waveform, and a carrier generator 44 for receiving the phase information of the reference waveform and outputting a carrier signal. Design of PLL circuits for use with three-phase waveforms is described, for example, in Weng et al., US2007/0159265, which is incorporated herein by reference in its entirety.

In one embodiment, the carrier signal is a triangle waveform, and PWM modulator 36 further comprises a comparator 46 for comparing the fundamental waveform with the triangle carrier waveform and generating a PWM pattern signal 38 to drive switches 34 (FIG. 2). In another embodiments, the PWM modulators 36 are Space Vector PWM modulators, and the carrier signals are each a switching signal with predetermined switching periods. In one embodiment, a ratio of the carrier signal frequency to the fundamental waveform frequency is an integer and may be used to generate synchronous PWM patterns. In other embodiments wherein the ratio is not an integer, the generated PWM patterns are asynchronous.

Figure 4:
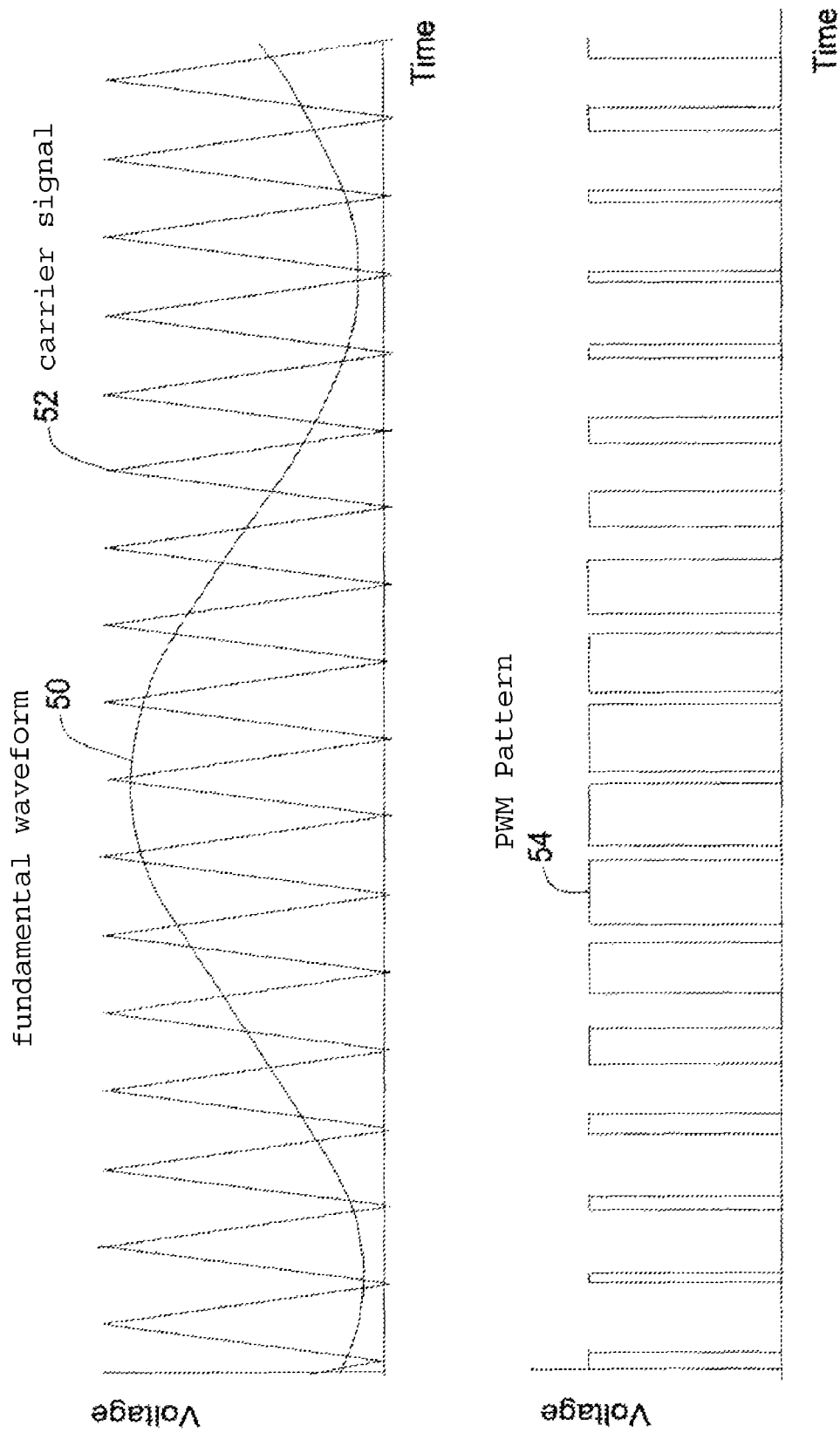
FIG. 4 is a pair of graphs illustrating an exemplary fundamental waveform, a triangle carrier waveform, and a PWM pattern generated by comparison of the fundamental waveform with the triangle carrier waveform.

Referring to FIG. 4, in one embodiment, the fundamental waveform comprises a sine waveform 50, the carrier signal comprises a triangular waveform 52, and a PWM pattern 54 is generated based on a comparison of the sine waveform 50 with the triangular waveform 52. In one embodiment, when an instantaneous amplitude of the sine waveform 50 is greater than an instantaneous amplitude of the triangular waveform 52, the PWM pattern 54 is a logic "High" (or on). When an instantaneous amplitude of the sine waveform 50 is less than an instantaneous amplitude of the triangular waveform 52, the PWM pattern 54 is a logic "low" (or off). The so formed PWM pattern 54 is a series of pulses.

In a first embodiment of the invention, PWM patterns for a corresponding phase, for example phase Ua, of different wind turbine electrical systems 18 are interleaved via master controller 25 and/or each wind turbine electrical system controller 24 (FIG. 2). In a more specific example, the carrier signals for individual wind turbine electrical systems 18 have the same frequency and amplitude, but are interleaved relative to each other over a carrier signal cycle. For example, each carrier signal may be spaced a degree of 360/n with respect to the carrier cycle from the carrier signal of another wind turbine electrical system 18, wherein n is the number of wind turbine electrical systems 18 in power generation system 10. For a power generation system 10 with four wind turbine electrical systems 18, in one embodiment, each carrier signal of one phase of the grid side converter 32 is spaced from one another by 90 degrees.

Figure 5:
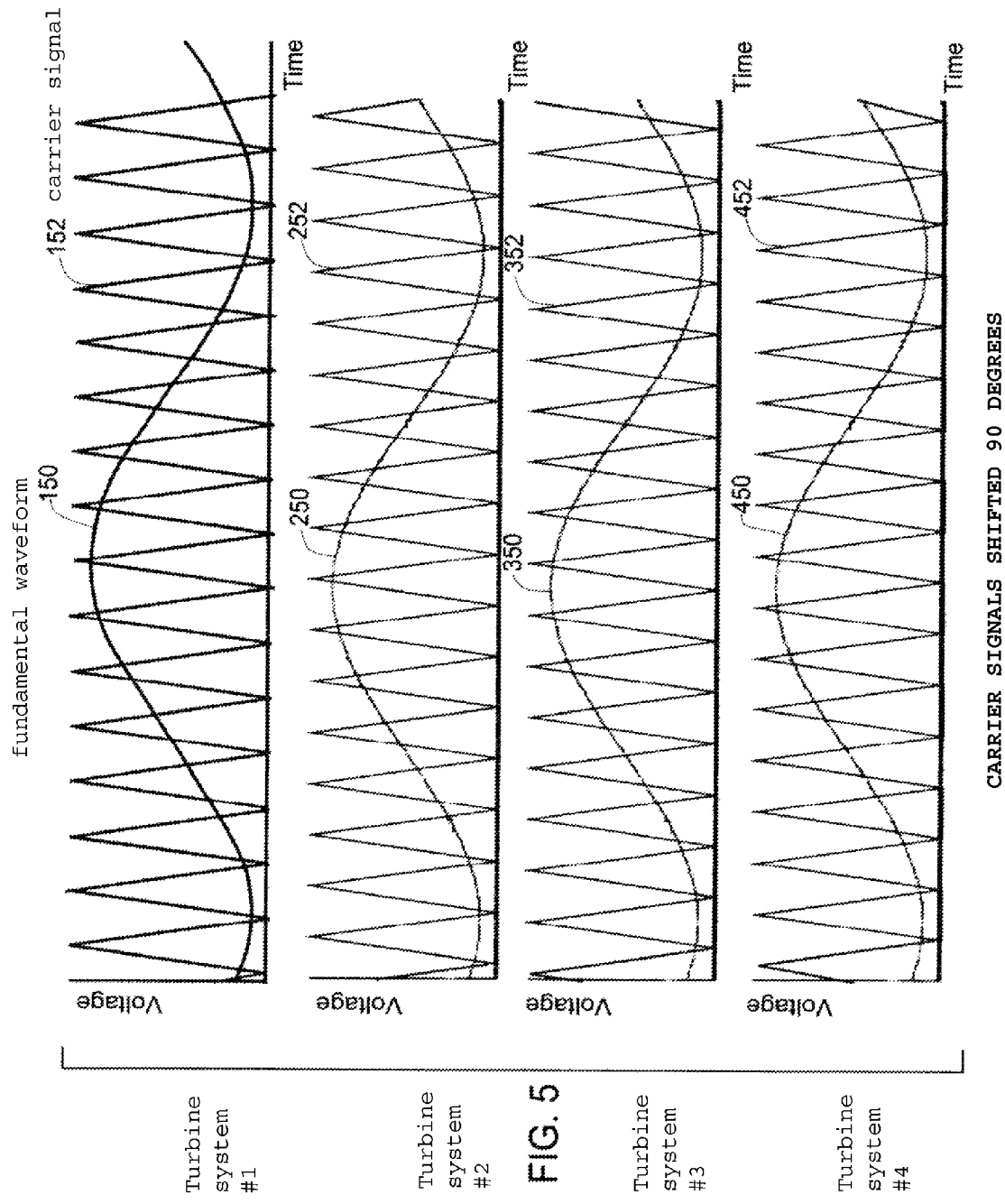
FIG. 5 is a set of graphs illustrating fundamental waveforms and triangle carrier waveforms for one corresponding phase of converters in different wind turbine electrical systems.

Referring to FIG. 5, carrier signals 152, 252, 352 and 452 of four turbine systems are shifted by 90 degrees over the carrier cycle, and fundamental waveforms 150, 250, 350 and 450 for four wind turbine electrical systems 18 are the same. In this example, a second, third and fourth carrier signals 252, 352 and 452 of grid side converters 32 of the second, third and fourth wind turbine electrical systems 18 are respectively shifted by 90 degrees, 180 degrees, and 270 degrees with respect to first carrier signal 152 over the carrier signal cycle.

Figure 6:
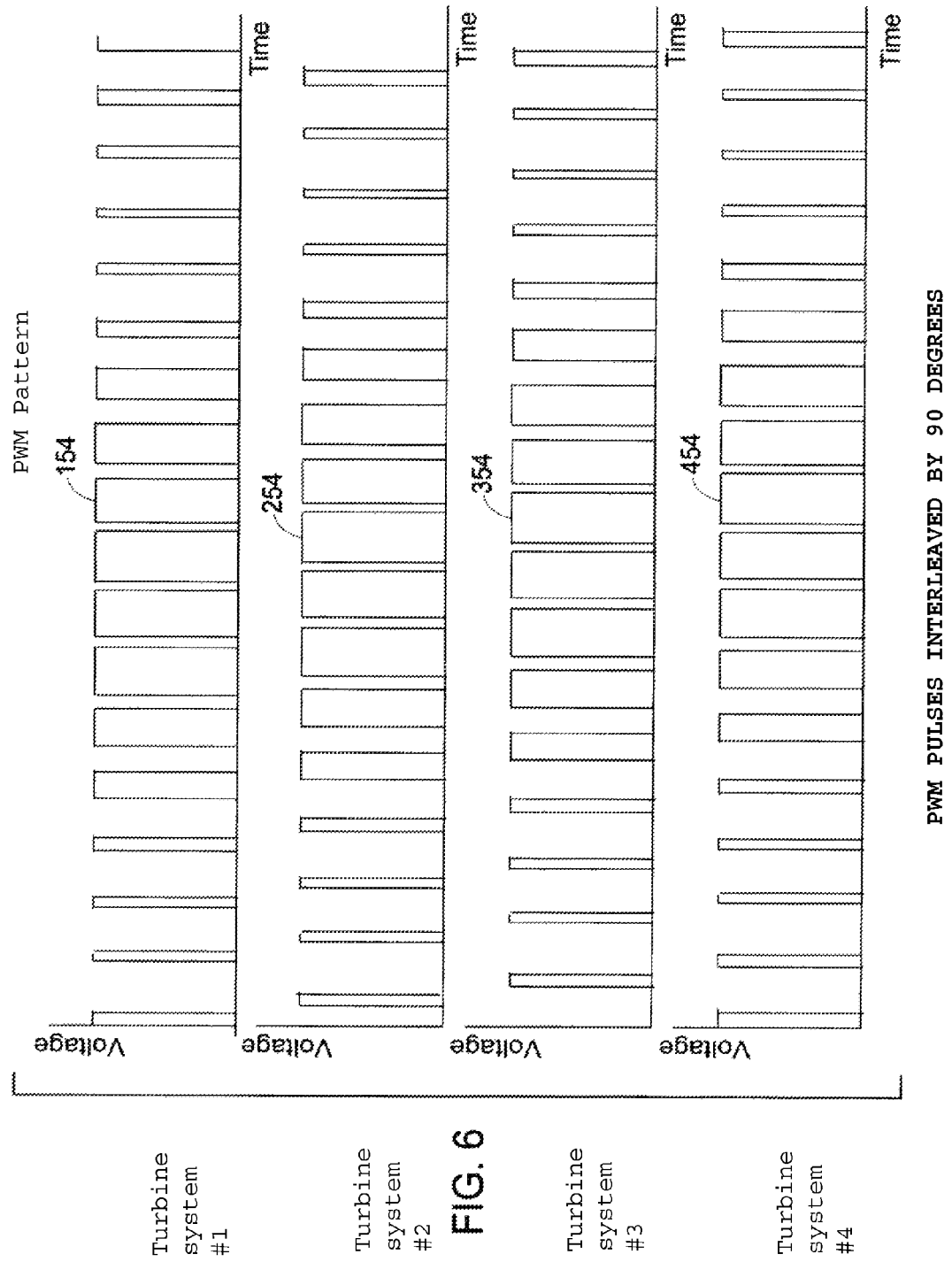
FIG. 6 is a set of graphs illustrating PWM patterns for a corresponding phase of converters in different wind turbine electrical systems by comparison of the fundamental waveforms and triangle carrier waveforms of FIG. 5.

FIG. 6 is a set of graphs illustrating the PWM patterns 154, 254, 354 and 454 for the embodiment of FIG. 5. The four PWM patterns 154, 254, 354 and 454 are each a serial of pulses with the same amplitude, and are substantially interleaved by 90 degrees of the carrier signal cycle with respect to an adjacent PWM pattern.

In certain embodiments, for each wind turbine electrical system 18, the respective PWM modulator 36 includes three PLL circuits 40 with one PLL circuit for each of the three phases and is used to generate three PWM patterns for switches of the three phases. The PWM patterns drive switches 34 of the grid side converters 32 to generate voltage pulses which are further transformed by individual turbine transformers 22, and may also optionally be filtered by inductors and capacitors, into a voltage signal that meets the frequency and voltage requirements of PCC 16. The voltage signals of different wind turbine electrical systems 18 are then coupled in parallel to PCC 16. A combined sine wave at the PCC is thus a sum of the voltage signals of all wind turbine electrical systems 18 and has reduced harmonics.

In a second embodiment of the invention, referring back to FIGS. 1 and 2, PWM patterns for a corresponding phase, for example Ua, of grid side converter 32 in different wind turbine electrical systems 18 are phase shifted by a different technique wherein carrier signals for the corresponding phase of different wind turbine electrical systems 18 are the same, and the fundamental waveforms for the corresponding phase of different wind turbine electrical systems 18 are interleaved by being shifted between each other evenly over a fundamental waveform cycle by a degree of 60/n, wherein n is the number of wind turbine electrical systems 18 in power generation system 10. The phase shifted PWM patterns drive the switches 34 and generate a plurality of voltage pulses. Turbine transformers 22 may be used to transform the voltage pulses and restore the shifted phases between wind turbine electrical systems 18.

Figure 7:
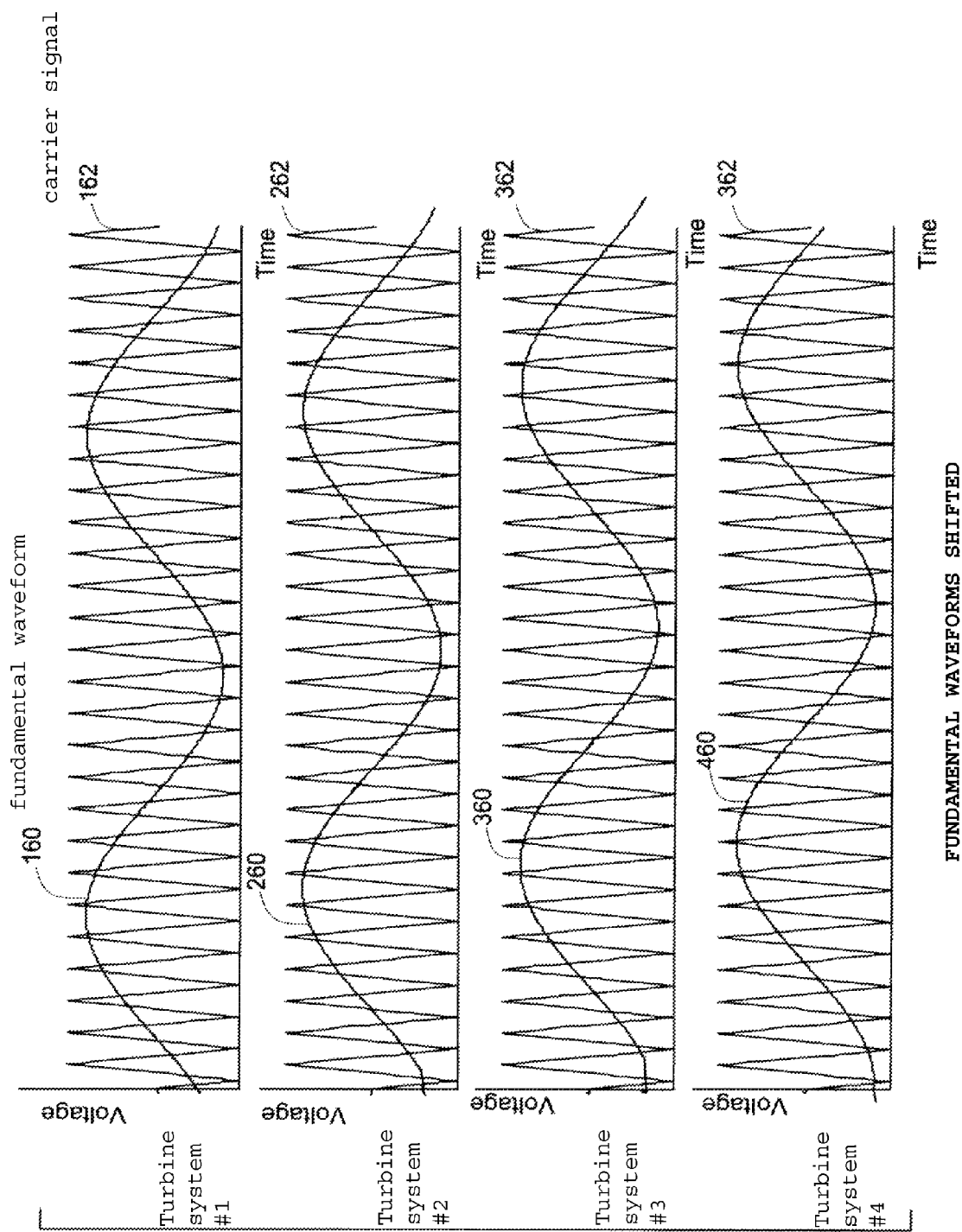
FIG. 7 is a set of graphs illustrating fundamental waveforms and triangle carrier waveforms for a corresponding phase of converters in different wind turbine electrical systems according to another embodiment.

In one specific embodiment, PLL circuits 40 of each wind turbine electrical system 18 are electrically coupled to PCC 16 to obtain a global reference (that is, the same carrier signal and the same fundamental waveform). The fundamental waveforms are then shifted between wind turbine electrical systems 18. FIG. 7 shows such an embodiment wherein carrier signals 162, 262, 362 and 462 and fundamental waveforms 160, 260, 360 and 460 for one phase, for example phase Ua, of four wind turbine electrical systems 18 are generated from the global reference. Carrier signals 162, 262, 362 and 462 are the same. Fundamental waveforms 160, 260, 360 and 460 are shifted over the fundamental waveform cycle by 15 degrees between adjacent wind turbine electrical systems 18.

Figure 8:
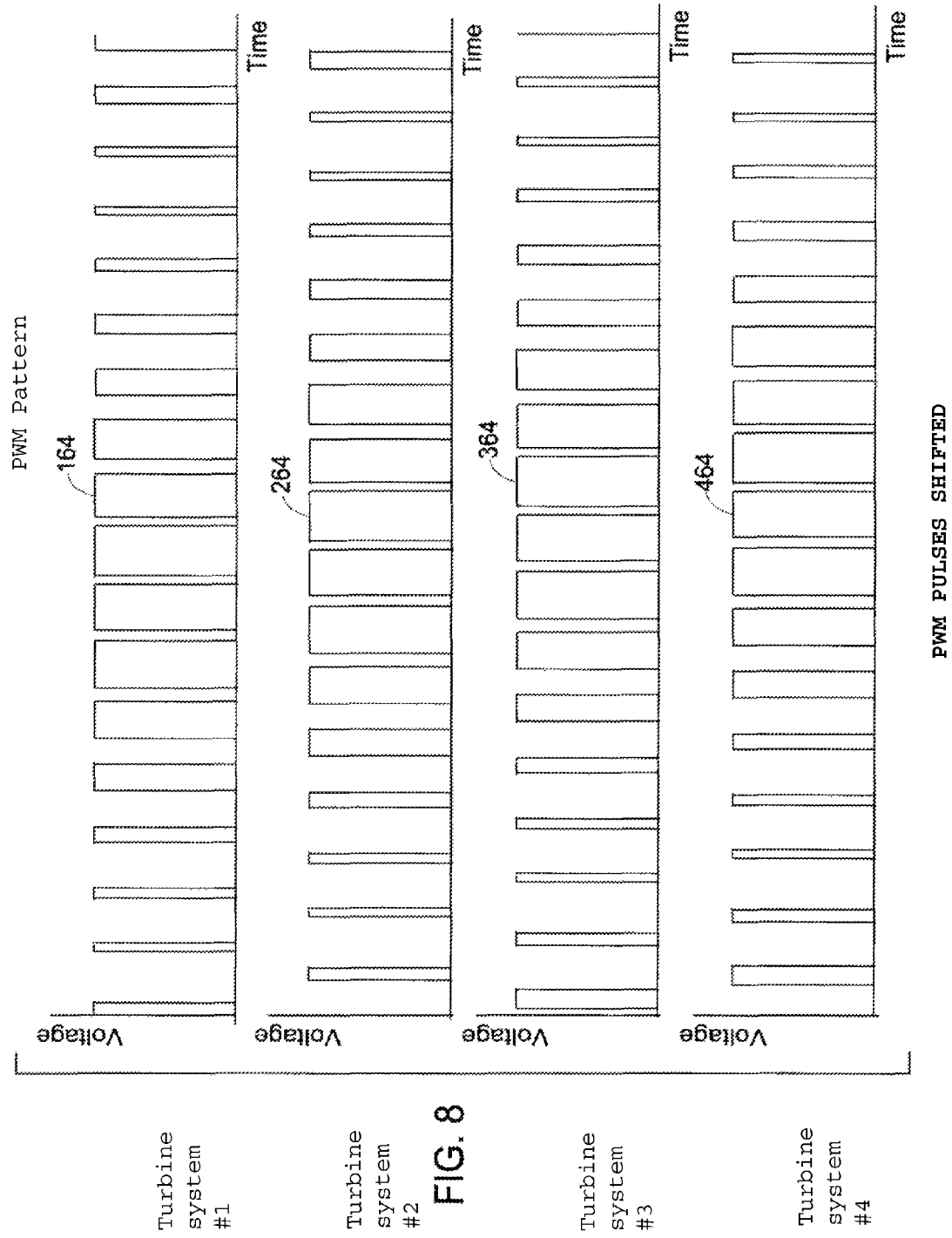
FIG. 8 is a set of graphs illustrating PWM patterns for a corresponding phase of converters in different wind turbine electrical systems by comparison of the fundamental waveforms and triangle carrier waveforms of FIG. 7.

Referring to FIG. 8, PWM patterns 164, 264, 364 and 464 for one phase of each of the four wind turbine electrical systems 18 are obtained by comparison of the fundamental waveforms 160, 260, 360 and 460 with the carrier signals 162, 262, 362 and 462. Each of the PWM patterns 164, 264, 364 and 464 is a series of pulses with common amplitude and symmetry and with slightly different widths of individual pulses. The pulse patterns are shifted over the fundamental waveform cycle by 15 degrees. In the exemplary embodiment, the fundamental waveforms 260, 360 and 460 of the second, third and fourth wind turbine electrical systems 18 are respectively shifted by 15 degrees, 30 degrees and 45 degrees over the fundamental waveform cycle with respect to the first fundamental waveform 160 of the first wind turbine electrical system 18.

The phase shifted PWM patterns drive the switches 34 of grid side converters 32 and generate a plurality of voltage pulses, and, in one embodiment, each turbine transformer 22 transforms the voltage pulses and restores the PWM phase shifting. In one embodiment which is corresponding to the PWM phase shifting shown in FIG. 8, turbine transformer 22 of the first wind turbine electrical system 18 is, for example, a wye-wye transformer and the waveform is not shifted. Turbine transformers 22 of the second, third and fourth wind turbine electrical systems 18 respectively have −15, −30 and −45 degree phase shifting with respect to the first waveform over the PWM pattern cycle. Turbine transformers 22 of the second, third and fourth wind turbine electrical systems 18 are phase shifting transformers, for example zig-zag transformers or extended-delta-configured transformers, to restore the shifted angle in fundamental waveforms. The shifted degrees of the waveforms of turbine transformers 22 are correlated to the PWM shifted degrees i.e. fundamental waveform shifting degrees. After the PWM shifting and restoration, only harmonics of order numbers N·6·t±1 are un-canceled, wherein t=1, 2, 3, . . . , and N is the number of grid side converters 32, i.e. the number of wind turbine electrical systems 18 in power generation system 10.

In an alternative embodiment, as discussed above with respect to FIG. 2, PLL circuits 40 of each wind turbine electrical system 18 are electrically coupled to the lower voltage side 21 of each wind turbine electrical system 18 to get a corresponding local reference. The carrier signals and the fundamental waveforms of different wind turbine electrical system 18 may have slightly different phases in such local reference embodiments.

Figure 9:
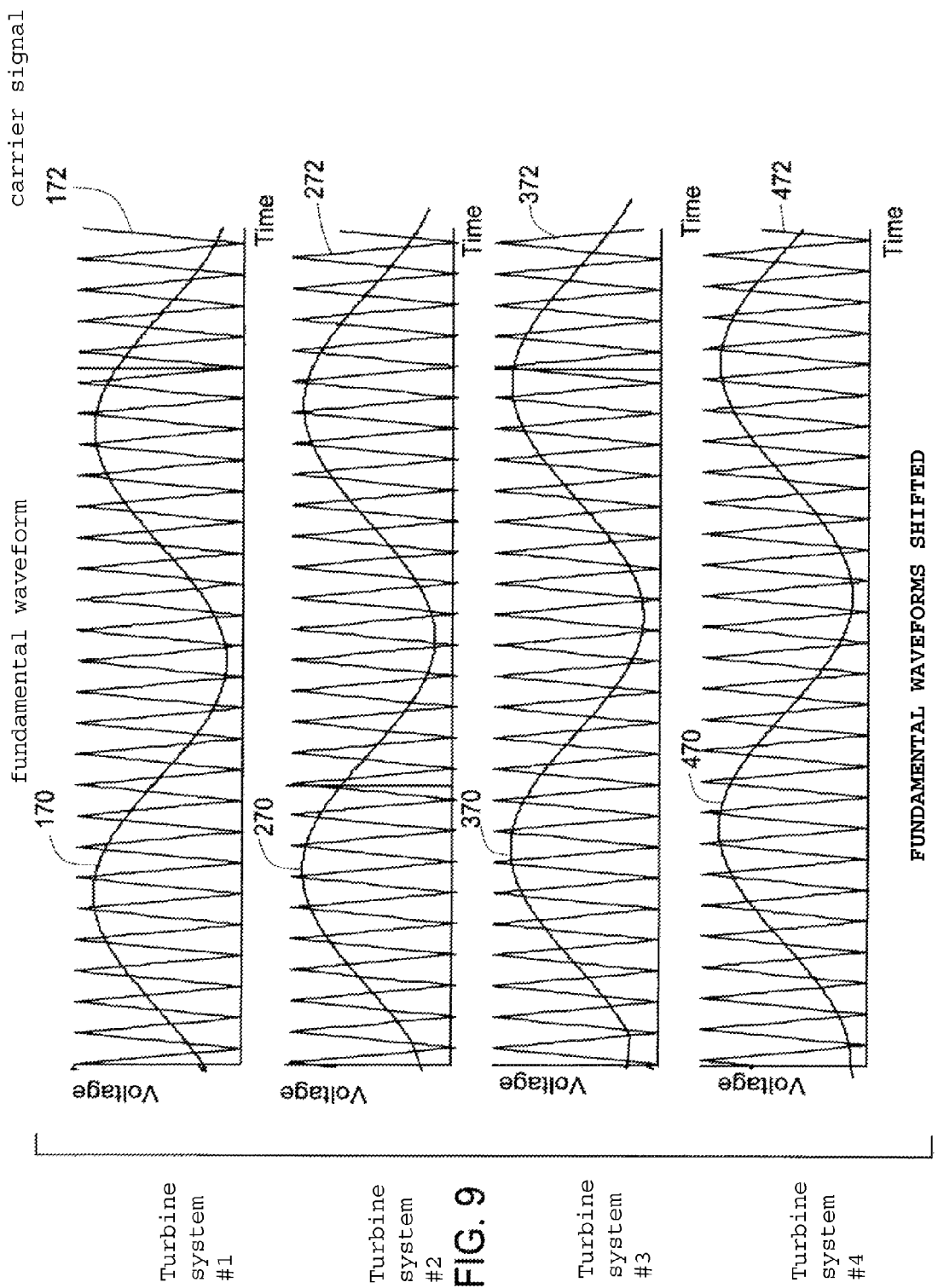
FIG. 9 is a set of graphs illustrating fundamental waveforms and triangle carrier waveforms for a corresponding phase of converters in different wind turbine electrical systems according to still another embodiment.

As shown in FIG. 9, carrier signals 172, 272, 372, 472 and fundamental waveforms 170, 270, 370 and 470 are generated based on local references of different wind turbine electrical systems 18. The fundamental waveforms 170, 270, 370 and 470 are shifted over the fundamental waveform cycle by 15 degrees between adjacent wind turbine electrical systems 18.

In certain embodiments, PWM patterns for the three phases Ua, Ub and Uc of the grid side converters 32 in the same wind turbine electrical system 18 are the same. In one embodiment, if a frequency ratio between the carrier signal and fundamental waveform is equal to 3*N, wherein N is an integer, the fundamental waveforms for the three phases are shifted by 120 degrees with respect to one another over the fundamental waveform cycle and are compared with the same carrier signal such that the resulting PWM patterns for the three phases are the same. The harmonic voltages at carrier frequencies are common mode waveforms, so they do not contribute to any output differential mode currents. Thus, harmonics with frequencies 3*N times of the fundamental waveform are canceled and are not shown at PCC 16.

In another embodiment, if the frequency ratio between carrier signal and fundamental waveform is not equal to 3*N, in order to get the same PWM pattern for the three phases in the same wind turbine electrical system 18, the carrier signals of three phases are shifted by $$\frac{2\pi}{3}$$

over the fundamental cycle with respect to one another. The shifted carrier signal compares with the fundamental waveforms of the three phases that are phase shifted over the fundamental waveform cycle to get the same PWM patterns for the three phases.

In another embodiment, PWM patterns of different wind turbine electrical systems 18 are both interleaved and phase shifted, and the turbine transformers restore shifted phases in the output waveforms. To some extent, the third embodiment is a combination of the embodiments described above with respect to FIGS. 5-6 and 7-9, and thus similar description is omitted hereinafter. As described above with reference to FIG. 8, by PWM shifting and transformer restoring between the four wind turbine electrical systems 18, only harmonic of orders N·6·t±1 remain, which may be further reduced by carrier signal interleaving.

In one specific embodiment, the carrier signal between the wind turbine electrical systems 18 are interleaved by t*60/N degrees, wherein N is the number of wind turbine electrical systems 18 in power generation system 10 and t is an integer. For the exemplary power generation system 10 in FIG. 1 with four wind turbine electrical systems 18, the carrier signals between the wind turbine electrical systems 18 may interleaved by 15*t degrees.

In a power generation system 10 with at least two wind turbine electrical systems 18, each of the order k harmonics of the at least two wind turbine electrical systems 18 is a harmonic vector $\vec{H}\_k$ including an amplitude component and a phase angle component Phi_k. In one embodiment, a clean cancellation of harmonics of a determined order k can be obtained by having a sum of the harmonic vectors of the at least two wind turbine electrical systems 18 be zero. In one embodiment, the amplitude components of the order k harmonics of the at least two wind turbine electrical systems 18 are substantially the same.

In certain embodiments, the fundamental waveform is expressed as:

$$Q_m \cos(k_m \omega t + Phi\_m),$$

wherein $Q_m$ is an amplitude of the fundamental waveform; Phi_m is a phase angle of the fundamental waveform; $k_m$ is a frequency order of the fundamental waveform (and a default value for $k_m$ is 1), and $\omega = 2*\pi*60$. The triangle carrier waveform is expressed as:

$$\frac{\pi}{2}\cos(k_c \omega t + Phi\_c),$$

wherein $\pi/2$ is an amplitude of the triangle carrier waveform; Phi_c is a phase angle of the triangle carrier waveform over the triangle carrier waveform cycle; $k_c$ is the frequency order of the triangle carrier waveform; and $\omega = 2*\pi*60$.

For the order k harmonics, k is subject to Equation 1:

$$k = m \cdot k_c + n \cdot k_m. \qquad \text{Equation 1}$$

wherein m and n are respectively integers.

In one embodiment, the phase angle of the order k harmonics of the at least two wind turbine electrical systems 18 can be expressed, for simplicity, as an array in the following Equation 2:

$$\begin{bmatrix} Phi\_k\_1 \\ Phi\_k\_2 \\ \ldots \\ Phi\_k\_N \end{bmatrix} = m \cdot \begin{bmatrix} Phi\_c\_1 \\ Phi\_c\_2 \\ \ldots \\ Phi\_c\_N \end{bmatrix} + n \cdot \begin{bmatrix} Phi\_m\_1 \\ Phi\_m\_2 \\ \ldots \\ Phi\_m\_N \end{bmatrix} + k \cdot \begin{bmatrix} 0 \\ 60/N \\ \ldots \\ (N-1)*60/N \end{bmatrix} + Seq(k) \cdot \begin{bmatrix} 0 \\ -60/N \\ \ldots \\ -(N-1)*60/N \end{bmatrix} \qquad \text{-Equation 2}$$

wherein Phi_k_1, Phi_k_2, Phi_k_N are respectively phase angles of order k harmonics from first, second and number N wind turbine electrical systems 18 in power generation system 10. The first two terms on the right side of equation are determined by modulation of PWM carrier interleaving, the third term is driven by PWM fundamental waveform shifting, and the forth term is contributed by transformer phase restoration. Seq(k) is the phase sequence of order k harmonics with respect to the fundamental waveform at PCC. For each of the wind turbine electrical systems 18, the three phases Ua, Ub and Uc of the fundamental waveform at PCC 16 is accordingly:

$$Ua = U \cdot \sin \omega t$$

$$Ub = U \cdot \sin(\omega t - 120°)$$

$$Uc = U \cdot \sin(\omega t + 120°)$$

For the order k harmonics, the three phase harmonics voltages are respectively:

$$Uka = Uk \cdot \sin k\omega t$$

$$Ukb = Uk \cdot \sin(k\omega t - k120°)$$

$$Ukc = Uk \cdot \sin(k\omega t + k120°)$$

Seq(k)=1 represents that the order k harmonics has a positive sequence with respect to the fundamental waveform; Seq(k)=−1 represents that the order k harmonics has a negative sequence with respect to the fundamental waveform; and Seq(k)=0 represents that order k harmonics has a zero sequence. Harmonics with a zero sequence will not be shown at PCC 16. In the exemplary power generation system 10 with four wind turbine electrical system 18, Equation 2 is as follows:

$$\begin{bmatrix} Phi\_k\_1 \\ Phi\_k\_2 \\ Phi\_k\_3 \\ Phi\_k\_4 \end{bmatrix} = m \cdot \begin{bmatrix} Phi\_c\_1 \\ Phi\_c\_2 \\ Phi\_c\_3 \\ Phi\_c\_4 \end{bmatrix} + n \cdot \begin{bmatrix} Phi\_m\_1 \\ Phi\_m\_2 \\ Phi\_m\_3 \\ Phi\_m\_4 \end{bmatrix} + k \cdot \begin{bmatrix} 0 \\ 15 \\ 30 \\ 60 \end{bmatrix} + Seq(k) \cdot \begin{bmatrix} 0 \\ -15 \\ -30 \\ -60 \end{bmatrix}$$

The phase angle array of harmonics at $k = m \cdot k_c + n \cdot k_m$ is simplified as Equation 3 below:

$$\begin{bmatrix} Phi\_k\_1 \\ Phi\_k\_2 \\ Phi\_k\_3 \\ Phi\_k\_4 \end{bmatrix} = m \cdot \begin{bmatrix} Phi\_c\_1 \\ Phi\_c\_2 \\ Phi\_c\_3 \\ Phi\_c\_4 \end{bmatrix} + n \cdot \begin{bmatrix} Phi\_m\_1 \\ Phi\_m\_2 \\ Phi\_m\_3 \\ Phi\_m\_4 \end{bmatrix} + $$

$$(m \cdot k_c + n \cdot k_m) \cdot \begin{bmatrix} 0 \\ 15 \\ 30 \\ 45 \end{bmatrix} + Seq(k) \cdot \begin{bmatrix} -0 \\ -15 \\ -30 \\ -45 \end{bmatrix} \quad \text{Equation 3}$$

For order k harmonics, the second, third and fourth terms of equation 3 are determined, and only the first term regarding interleaved phase angle of carrier signals can be adjusted. In one embodiment, the carrier phase angles over the carrier signal cycle of the four converters to be adjusted are in form of Equation 4 below:

$$\begin{bmatrix} Phi\_c\_1 \\ Phi\_c\_2 \\ Phi\_c\_3 \\ Phi\_c\_4 \end{bmatrix} = k_{c\_adj} \cdot \begin{bmatrix} 0 \\ 15 \\ 30 \\ 45 \end{bmatrix} \quad \text{Equation 4}$$

wherein "$k_{c\_adj}$" is a co-efficient of the carrier phase angle adjustment among wind turbine electrical systems 18.

In one embodiment, the electrical system is under power balancing conditions wherein the wind turbine electrical systems 18 have substantially the same DC voltage at DC buses 31 and have the same voltage outputs at PCC 16, and use the same carrier signal for the three phases Ua, Ub and Uc in each wind turbine electrical system 18. In this embodiment, $k = m \cdot k_c + n \cdot k_m$, and Seq(k) is only determined by n. Thus, according to Equations 3 and 4, Equation 3 can be simplified in Equation 5 below.

$$\begin{bmatrix} Phi\_k\_1 \\ Phi\_k\_2 \\ Phi\_k\_3 \\ Phi\_k\_4 \end{bmatrix} = m \cdot (k_{c\_adj} + k_c) \begin{bmatrix} 0 \\ 15 \\ 30 \\ 45 \end{bmatrix} + (n - Seq(n)) \cdot \begin{bmatrix} 0 \\ 15 \\ 30 \\ 45 \end{bmatrix} \quad \text{Equation 5}$$

Figures 10, 11:
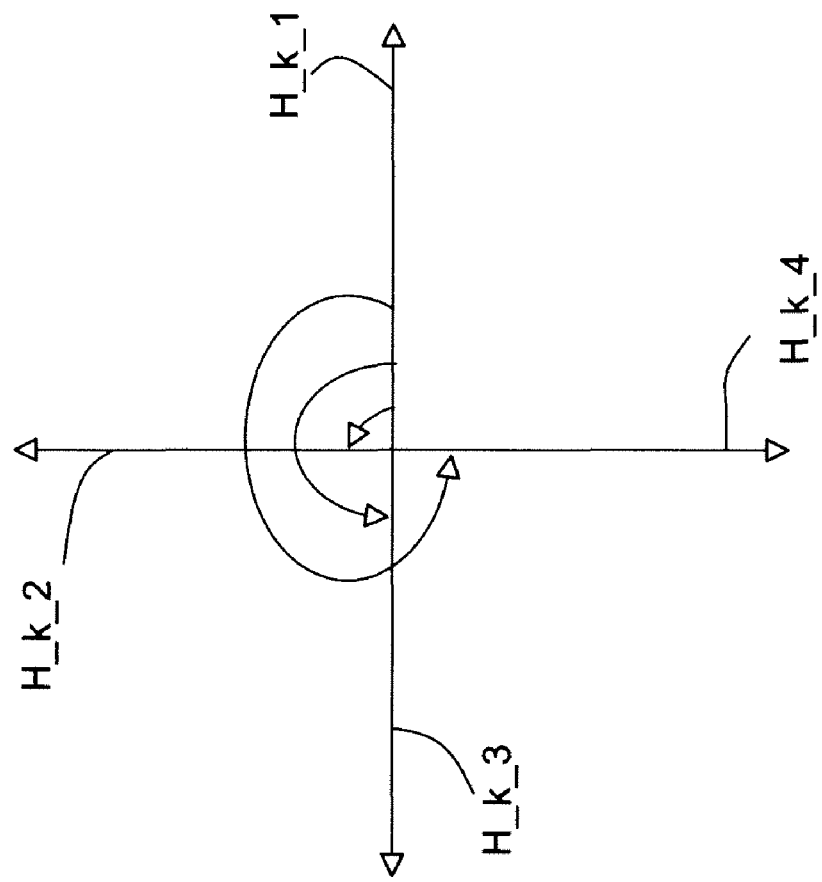
FIG. 10 is a vector diagram of harmonic vectors of four wind turbine electrical systems according to one embodiment.
FIG. 11 is a vector diagram of harmonic vectors of four wind turbine electrical systems according to another embodiment.

Accordingly, in one embodiment with references to FIGS. 10 and 11, a total harmonics at the order k is canceled when a sum of the harmonics vectors $\vec{H}\_k\_1$, $\vec{H}\_k\_2$, $\vec{H}\_k\_3$, and $\vec{H}\_k\_4$ of the first, second, third, and fourth wind turbine electrical systems 18 is zero. In one embodiment, since the amplitude components of the harmonics $\vec{H}\_k\_1$, $\vec{H}\_k\_2$, $\vec{H}\_k\_3$, and $\vec{H}\_k\_4$ are substantially the same, by selecting a proper coefficient Kc_adj to adjust the phase components of the harmonics vectors according to Equations 1 and 5, the harmonic vector sum can be driven towards zero.

In one example, to cancel the $25^{th}$ harmonics of the power generation system 10 (k=25) when a frequency of the fundamental waveform is 60 HZ and for a frequency of the carrier signal is 780 HZ ($k_c$=13), Equation 1 $k = m \cdot k_c + n \cdot k_m$ is derived as 25=13m+n. Then one group of values for "m" and "n" is: m=2, n=−1. Accordingly "sequence(n)" in Equation 5 is sequence(−1)=−1. Thus equation 5 is derived as:

$$\begin{bmatrix} Phi\_k\_1 \\ Phi\_k\_2 \\ Phi\_k\_3 \\ Phi\_k\_4 \end{bmatrix} =$$

$$m \cdot (k_{c\_adj} + k_c) \begin{bmatrix} 0 \\ 15 \\ 30 \\ 45 \end{bmatrix} + (n - Seq(n)) \cdot \begin{bmatrix} 0 \\ 15 \\ 30 \\ 45 \end{bmatrix} = (k_{c\_adj} + 13) \cdot \begin{bmatrix} 0 \\ 30 \\ 60 \\ 90 \end{bmatrix}.$$

Thus, in one embodiment, when $k_{c\_adj}$=3, Phi_k_1, Phi_k_2, Phi_k_3, and Phi_k_4 are respectively 0 degree, 450 degrees, 900 degrees, and 1350 degrees, which constitutes the vectors diagram of FIG. 9, and the $25^{th}$ harmonics are canceled.

Figure 12:
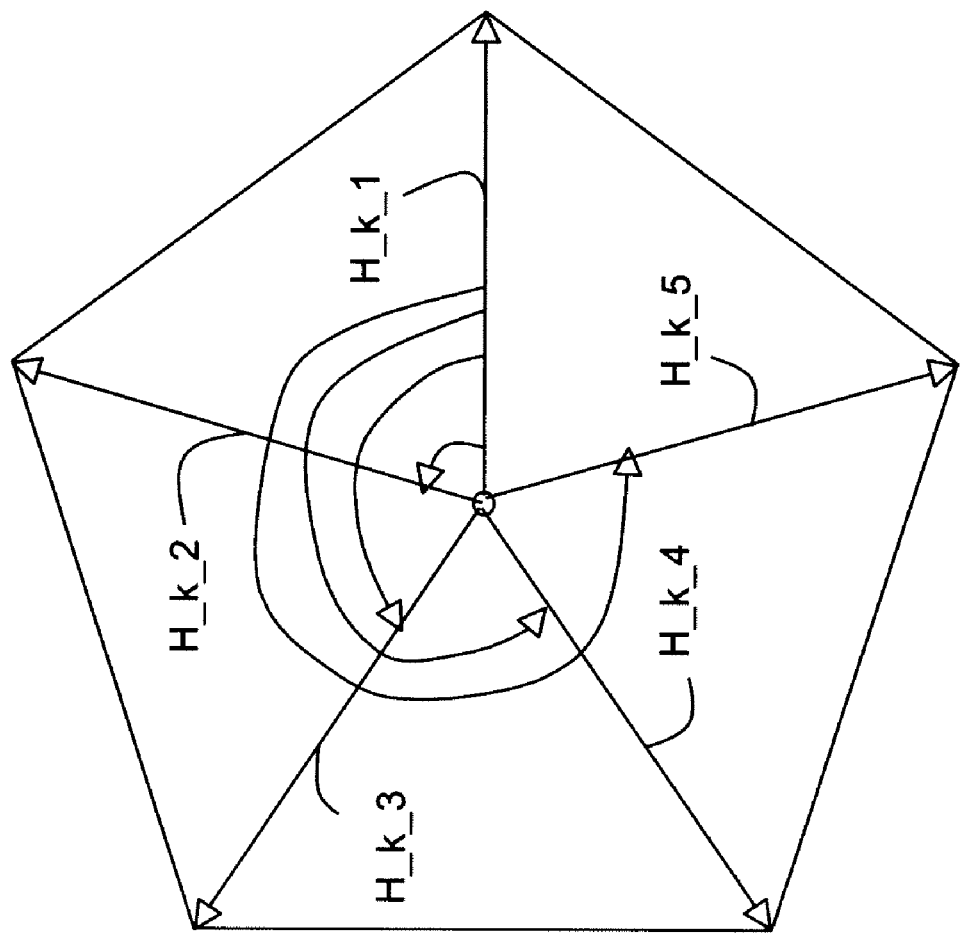
FIG. 12 is a vector diagram of harmonic vectors of five wind turbine electrical systems according to another embodiment.

In another embodiment, referring to FIG. 12, a vector diagram for cancellation of an order k harmonics for a power generation system 10 having five wind turbine electrical systems 18 is shown. This can be obtained by selecting a proper carrier phase angle coefficient to obtain a zero vector sum of the five wind turbine electrical systems 18.

Referring back to FIG. 1, in certain embodiments, power generation system 10 comprises a medium voltage collector system 80 which is a multi-port network including a plurality of inputs electrically coupling the wind turbine electrical systems 18 and a single output electrically coupled to PCC 16. Each wind turbine electrical system 18 is electrically connected to the medium voltage collector system (MVCS) 80 by, for example, medium voltage power cables. An impedance matrix between each wind turbine electrical system 18 and PCC 16 caused by MVCS 80 comprises resistance elements, capacitive elements, and/or inductive elements, each of which are substantially frequency dependant. The impedance matrix causes phase shifting at both the fundamental frequency and the order k harmonics between voltage signals at the high voltage side 23 of the turbine transformer 22 and at PCC 16. The total shifted angles $\theta_1$ and $\theta_2$ caused by the impedance matrix at fundamental frequency and order k harmonics may be referenced respectively as in equations 6 and 7 below:

$$\begin{bmatrix} \theta_{11} \\ \theta_{12} \\ \dots \\ \theta_{1N} \end{bmatrix} = Phi\_pcc - \begin{bmatrix} Phi\_m\_1 \\ Phi\_m\_2 \\ \dots \\ Phi\_m\_N \end{bmatrix} \quad \text{Equation 6}$$

$$\begin{bmatrix} \theta_{k1} \\ \theta_{k2} \\ \dots \\ \theta_{kN} \end{bmatrix} = \begin{bmatrix} Phi\_k_{pcc}\_1 \\ Phi\_k_{pcc}\_2 \\ \dots \\ Phi\_k_{pcc}\_N \end{bmatrix} - \begin{bmatrix} Phi\_k\_1 \\ Phi\_k\_2 \\ \dots \\ Phi\_k\_N \end{bmatrix} \quad \text{Equation 7}$$

wherein, Phi_pcc is the phase angle of voltage signal at fundamental frequency at PCC 16, and Phi_m_N is the phase angle of voltage signal at fundamental frequency at the high voltage side 23 of turbine transformer 22. Phi_k$_{pcc}$_N is the phase angle of voltage signal at the order k harmonic frequency at PCC 16, and Phi_k_N is the phase angle of voltage signal at the order k harmonic frequency at the high voltage side 23 of turbine transformer 22.

According to Equations 3, 6, and 7, in order to achieve a zero vector sum of the order k harmonics at PCC 16, the phase angle array of harmonics at k=m·k$_c$+n·k$_m$ for the exemplary four wind turbine systems 18 includes the shifted angles caused by the impedance matrix of MVCS 80. The phase angle array at PCC 16 is then expressed as:

$$\begin{bmatrix} \text{Phi\_k}_{pcc}\_1 \\ \text{Phi\_k}_{pcc}\_2 \\ \text{Phi\_k}_{pcc}\_3 \\ \text{Phi\_k}_{pcc}\_4 \end{bmatrix} = m \cdot \begin{bmatrix} \text{Phi\_c\_1} \\ \text{Phi\_c\_2} \\ \text{Phi\_c\_3} \\ \text{Phi\_c\_4} \end{bmatrix} + n \cdot \left( \text{Phi\_pcc} - \begin{bmatrix} \theta_{11} \\ \theta_{12} \\ \theta_{13} \\ \theta_{14} \end{bmatrix} \right) +$$

$$(m \cdot k_c + n \cdot k_m) \cdot \begin{bmatrix} 0 \\ 15 \\ 30 \\ 45 \end{bmatrix} + Seq(k) \cdot \begin{bmatrix} -0 \\ -15 \\ -30 \\ -45 \end{bmatrix} + \begin{bmatrix} \theta_{k1} \\ \theta_{k2} \\ \theta_{k2} \\ \theta_{k2} \end{bmatrix}$$

And can be further simplified as:

$$\begin{bmatrix} \text{Phi\_k}_{pcc}\_1 \\ \text{Phi\_k}_{pcc}\_2 \\ \text{Phi\_k}_{pcc}\_3 \\ \text{Phi\_k}_{pcc}\_4 \end{bmatrix} =$$

$$m \cdot \begin{bmatrix} \text{Phi\_c\_1} \\ \text{Phi\_c\_2} \\ \text{Phi\_c\_3} \\ \text{Phi\_c\_4} \end{bmatrix} + m \cdot k_c \begin{bmatrix} 0 \\ 15 \\ 30 \\ 45 \end{bmatrix} + (n - Seq(n)) \cdot \begin{bmatrix} 0 \\ 15 \\ 30 \\ 45 \end{bmatrix} + \left( \begin{bmatrix} \theta_{k1} \\ \theta_{k2} \\ \theta_{k2} \\ \theta_{k2} \end{bmatrix} - n \cdot \begin{bmatrix} \theta_{11} \\ \theta_{12} \\ \theta_{13} \\ \theta_{14} \end{bmatrix} \right)$$

Accordingly, a correction factor array for the interleaved angles Phi_c$_{cor}$_N of carrier signals are shown as Equation 8 as below:

$$\begin{bmatrix} \text{Phi\_c}_{cor}\_1 \\ \text{Phi\_c}_{cor}\_2 \\ \text{Phi\_c}_{cor}\_3 \\ \text{Phi\_c}_{cor}\_4 \end{bmatrix} = -\left( \begin{bmatrix} \theta_{k1} \\ \theta_{k2} \\ \theta_{k2} \\ \theta_{k2} \end{bmatrix} - n \cdot \begin{bmatrix} \theta_{11} \\ \theta_{12} \\ \theta_{13} \\ \theta_{14} \end{bmatrix} \right) / m \quad \text{Equation 8}$$

The shifted angles θ$_1$ and θ$_k$ for each wind turbine electrical system 18 depend on impedance matrix of the MVCS 80 at the fundamental frequency and the order k harmonics frequency. In certain embodiments, power generation system 10 further comprises an impedance measurement device for measuring the impedance matrix of MVCS 80 at a frequency range, including the fundamental frequency and harmonic frequencies, by any known method. In one exemplary embodiment, impedance matrix of MVCS 80 may be measured by transmitting a scanned voltage at a plurality of frequency ranges and recording the response impedances at the frequency ranges.

In certain embodiments, resistance elements, capacitive elements and/or inductive elements of impedance matrix of MVCS 80 may be change over time, and the turbine controllers 24 and/or master controller 25 may comprise a close-loop control system. The close-loop control system is connected with an impedance measurement device, and control of the interleaved angles of the carrier signals of each wind turbine system 18 is based on the measured impedance matrix of MVCS 80.

In one embodiment, with reference to FIG. 1, power conversion system 20 of each wind turbine electrical system 18 may include plurality of threads (not shown) each comprising one generator side converter, a DC bus, and a grid side converter. The threads within one power conversion system 20 are connected in parallel and joint to the turbine transformer 22. In one embodiment, carrier signals and fundamental waveforms for each grid side converters within one wind turbine electrical system 18 are the same.

In one embodiment, the wind farm 11 comprises a plurality of wind turbine groups, and each group comprises at least two wind turbines respectively having grid side converters. The at least two wind turbines may or may not be physically close to each other and may or may not have similar rated power. In one specific embodiment, the at least two wind turbines within one group are controlled by the individual turbine controllers or optionally by a group controller to interleave carrier signals, fundamental waveforms, or a combination of carrier signals and fundamental waveforms of the at least two wind turbines in the group to generate interleaved PWM patterns respectively for the grid side converters of the at least two wind turbines. Thus output of each group meets harmonic requirement at PCC 16.

In another specific embodiment, at least two wind turbines within one group are controlled by the individual turbine controllers or optionally by the master controller or a group controller to have phase shifting in the fundamental waveforms by a degree of 60/N, wherein N is the number of wind turbines in the group, and use zig-zag turbine transformers to restore the shifted angles. Wind turbines in different groups have interleaved carrier signals. While in still another specific embodiment, at least two wind turbines within one group have interleaved carrier signals. Wind turbines in different groups have phase shifting in the fundamental waveform by a degree of 60/M, wherein M is the number of groups in the wind farm 11, and use zig-zag turbine transformers 22 to restore the shifted angles.

Figure 13:
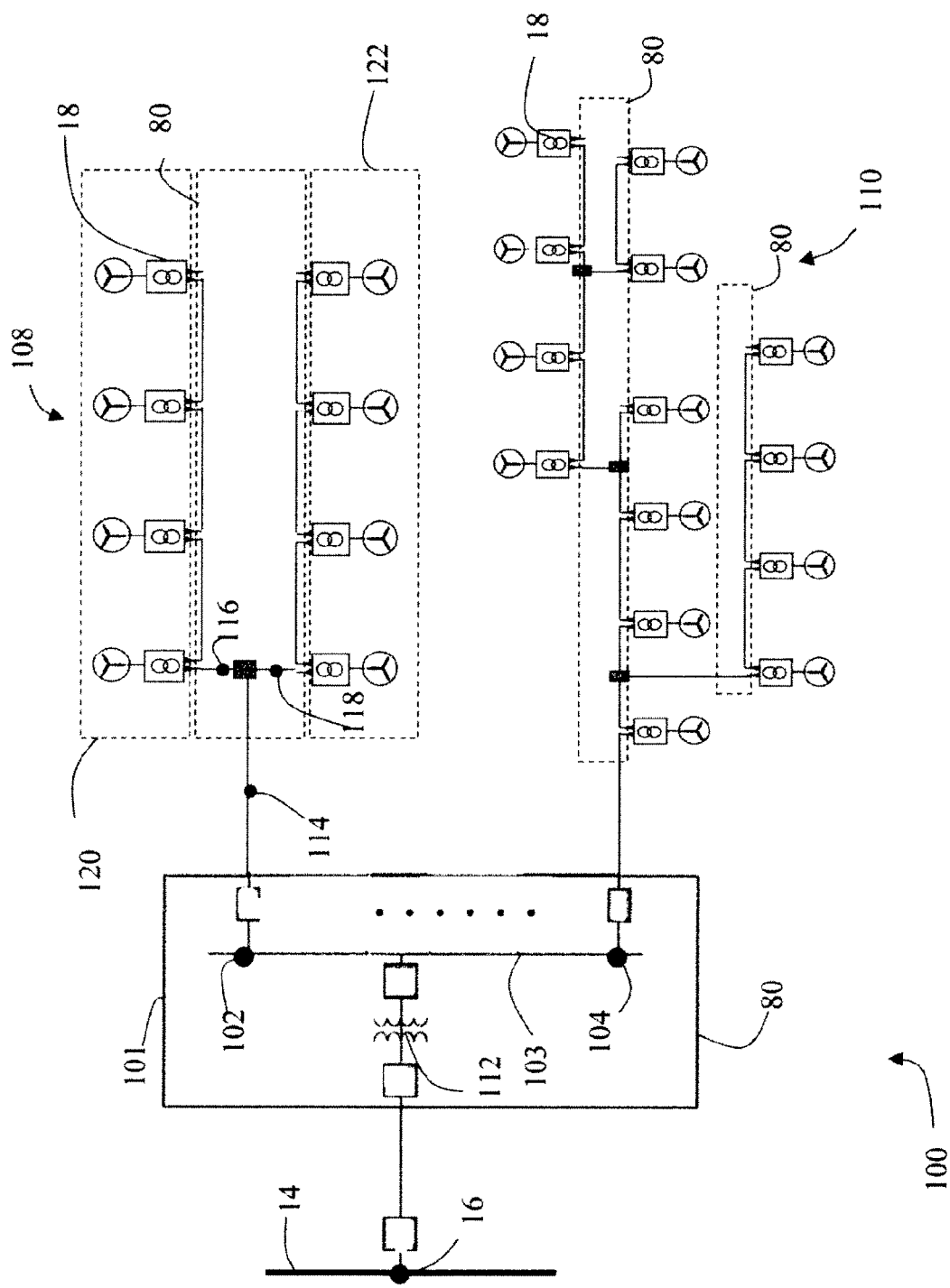
FIG. 13 is a block diagram illustrating a wind plant system including a substation system according to one embodiment.

Referring to FIG. 13, in one embodiment, wind farm 11 comprises at least one substation system 100 connected to electric grid 14 at PCC 16. Substation system 100 comprises a substation 101 and feeder systems 108 and 110 electrically coupled to a common bus 103 of the substation 101 at electrical connection points such as substation management points (SMPs) 102 and 104. In one embodiment, substation 101 comprises a step-up transformer 112 for transforming the medium voltage into a high voltage. In certain embodiments, wind farm 10 may comprise more substation systems connected in parallel at PCC 16, and each substation system may comprise at least one feeder system.

In one embodiment, each of the feeder systems 108 and 110 comprises a plurality of wind turbine electrical systems 18 which are, for example, daisy chained, bifurcated, or dendritic-radially connected to substation 101 through one or more multi-port MVCSs 80. In one embodiment, a control system for controlling the wind turbine electrical systems 18 connected through the same MVCS 80 is interleaved, and/or phase shifted (transformer restored) for grid side converters to achieve a harmonic reduction at an electrical connection point which is an output of the MVCS 80, with reference to the harmonic reduction control for PCC 16 above. The electrical connection point can be any point between the output of the MVCS 80 and the common bus 103 of substation 101, for example points 102, 114 of the feeder system 108.

In certain embodiments, each feeder system 108, 110 may comprise a plurality of groups connected by the same MVCS 80, for example, groups 120 and 122 both connected to the same MVCS 80 through electrical connection points 116 and 118. Each group 120, 122 comprises at least two wind turbine electrical systems 18 that may or may not be physically close to each other and may or may not have similar rated power. In one specific embodiment, at least two wind turbine electrical systems within one group are controlled by the individual turbine controllers or optionally by a group controller to interleave carrier signals, fundamental waveforms, or a combination of carrier signals and fundamental waveforms of the at wind turbine electrical systems 18 in one group to generate interleaved PWM patterns respectively for the grid side converters of the wind turbine electrical systems. Thus output of each group meets harmonic requirements at electrical connection points 116 and 118.

In another specific embodiment, at least two wind turbines within one group are controlled by the individual turbine controllers or optionally by the master controller or a group controller to have phase shifting in the fundamental waveforms by a degree of 60/N, wherein N is the number of wind turbines in the group, and use zig-zag turbine transformers to restore the shifted angles. Wind turbines in different groups have interleaved carrier signals. While in still another specific embodiment, the at least two wind turbines within one group have interleaved carrier signals. Wind turbines in different groups have phase shifting in the fundamental waveform by a degree of 60/M, wherein M is the number of groups in the wind farm 11, and use zig-zag turbine transformers 22 to restore the shifted angles.

In certain embodiments, a wind farm electrical system includes a global time reference for each wind turbine electrical system 18. In one embodiment, the global time reference is provided according to a Precision Time Protocol (PTP) or an IEEE-1588 protocol. In certain embodiments, the PTP or IEEE-1588 protocol is distributed to individual turbine controllers 24 via communication links, which may be implemented in hardware, software, or combinations thereof.

Although wind turbine systems have been discussed above for purpose of example, other forms of renewable energy, such as photovoltaic systems may additionally or alternatively be used. In one embodiment, a photovoltaic system comprises a plurality of photovoltaic electrical systems connected in parallel to feed electrical power to the electric grid 14 at PCC 16.

Figure 14:
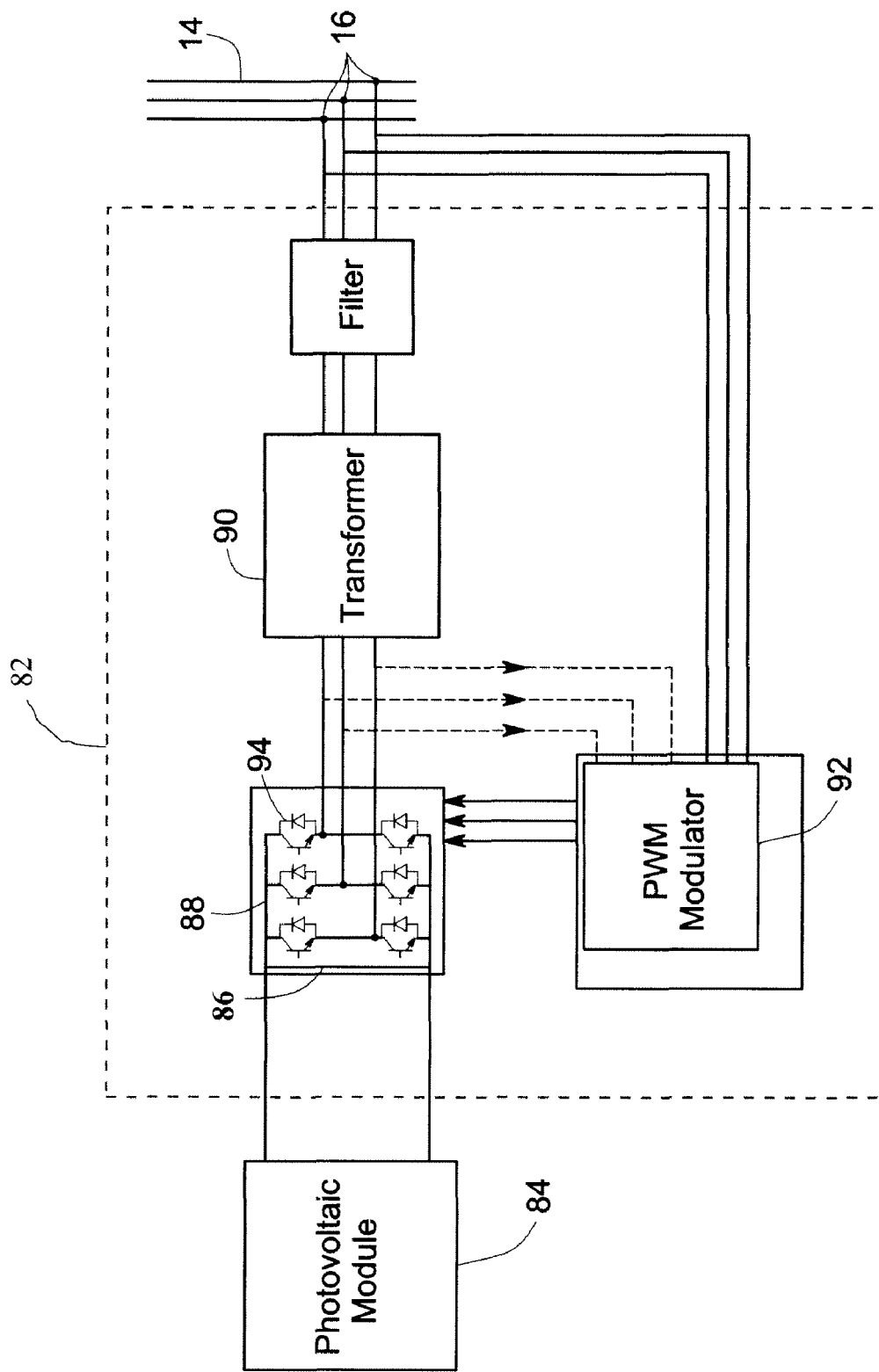
FIG. 14 is a block diagram of a photovoltaic electrical system in accordance with an embodiment disclosed herein.

Referring to FIG. 14, which is a block diagram of an exemplary photovoltaic electrically system 82 in accordance with an embodiment disclosed herein, each photovoltaic electrical system 82 includes a DC bus 86 receiving an direct current from a photovoltaic module 84, a grid side converter 88 comprising a plurality of switches 94 for transmitting DC current at DC bus 86 into alternating currents, and a transformer 90 for transforming the alternating current into a constant voltage and a certain frequency before the alternating current is fed to electric grid 14 at PCC 16.

Each photovoltaic electrical system 82 includes a PWM modulator 92 for obtaining a fundamental waveform and a carrier signal, using the fundamental waveform and carrier signal to generate a PWM pattern, and for providing the PWM pattern to a respective grid side converter for driving the switches 94 of the respective grid side converter 90. PWM modulators 92 of different photovoltaic electrical system 82 are configured to interleave carrier signals, fundamental waveforms, or a combination of carrier signals and fundamental waveforms of the at least two wind turbine electrical systems to generate interleaved PWM patterns respectively for the grid side converters 90 between different photovoltaic electrical systems 82 to reduce harmonics at PCC 16.

It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

Furthermore, the skilled artisan will recognize the interchangeability of various features from different embodiments. The various features described, as well as other known equivalents for each feature, can be mixed and matched by one of ordinary skill in this art to construct additional systems and techniques in accordance with principles of this disclosure.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of controlling electrical power systems coupled to an electrical connection point, the method comprising:
   generating carrier signals and fundamental waveforms from electrical power systems coupled to at least two renewable energy sources;
   generating respective pulse width modulation (PWM) signals for each of the respective electrical power systems using the carrier signals and the fundamental waveforms while phase shifting the fundamental waveforms of at least two of the electrical power systems with respect to each other; and
   driving grid side converters of the electrical power systems with the respective PWM signal.

2. The method of claim 1, wherein the at least two renewable energy sources comprise at least two wind turbines.

3. The method of claim 2, wherein generating the PWM signals further comprises:
   interleaving the carrier signals for each corresponding phase of the wind turbines;
   and
   restoring shifted phase angles of the fundamental waveforms.

4. The method of claim 3, wherein interleaving the carrier signals comprises selecting an interleaved angle of the electrical systems of the at least two wind turbines to obtain a zero vector sum for certain order harmonics of the wind turbines.

5. The method of claim 4 further comprising using a common carrier signal for each of three phases of one of the grid side converters.

6. The method of claim 5, wherein generating pulse width modulation signals comprises generating a common PWM pattern for each of the three phases of one of the grid side converters.

7. The method claim 4, wherein selecting an interleaved angle of the electrical systems comprises selecting an interleaved angle between the at least two electrical systems as an integral multiple of 60/n and n is the number of electrical systems.

8. The method of claim 3, comprising further interleaving the carrier signals for a compensation of phase shifting caused by impedances of electrical couplers between the transformer and the electrical connection point.

9. The method of claim 1, wherein the at least two renewable energy sources comprise at least photovoltaic modules.

* * * * *